Nov. 16, 1937.   J. L. SHROYER   2,098,979
AUTOMOBILE BRAKE TESTER
Filed April 17, 1936   2 Sheets-Sheet 1
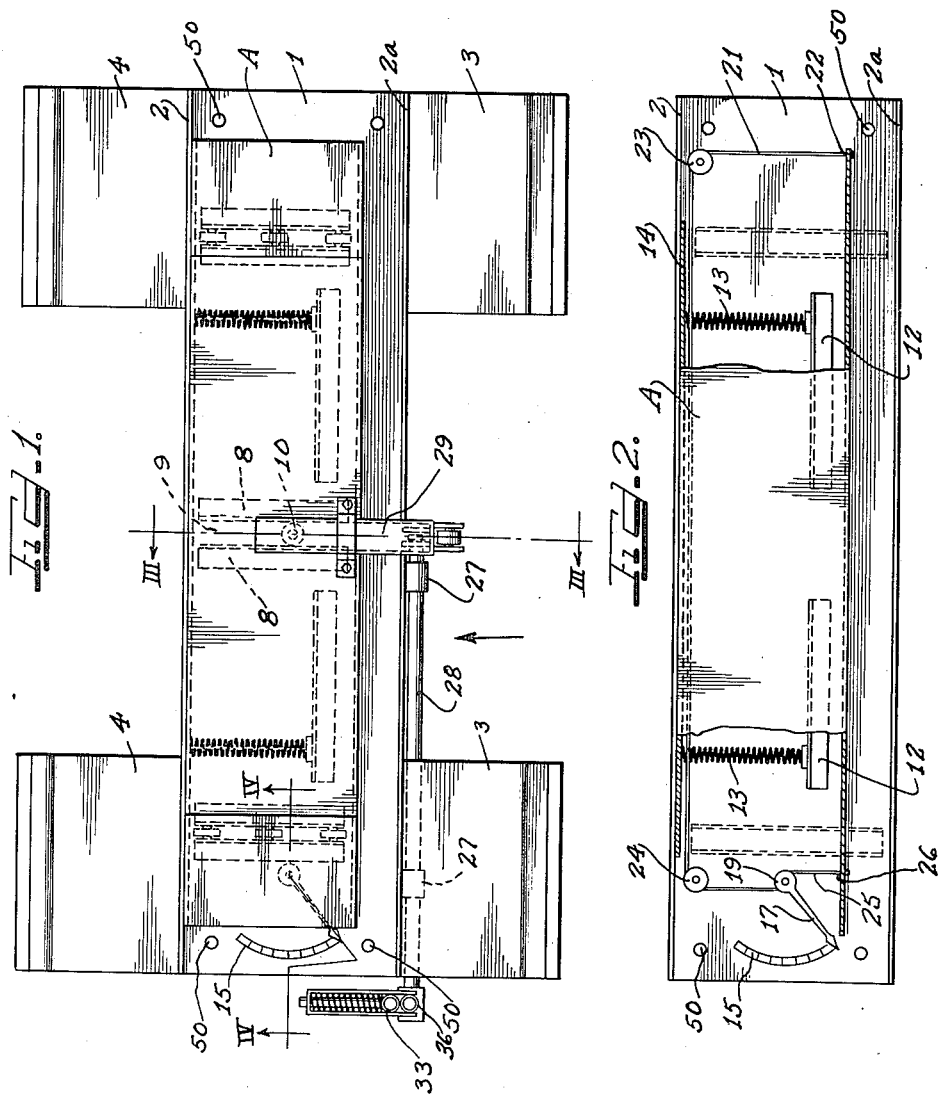
Inventor
JACOB L. SHROYER.
by Charles W. Hills Attys.

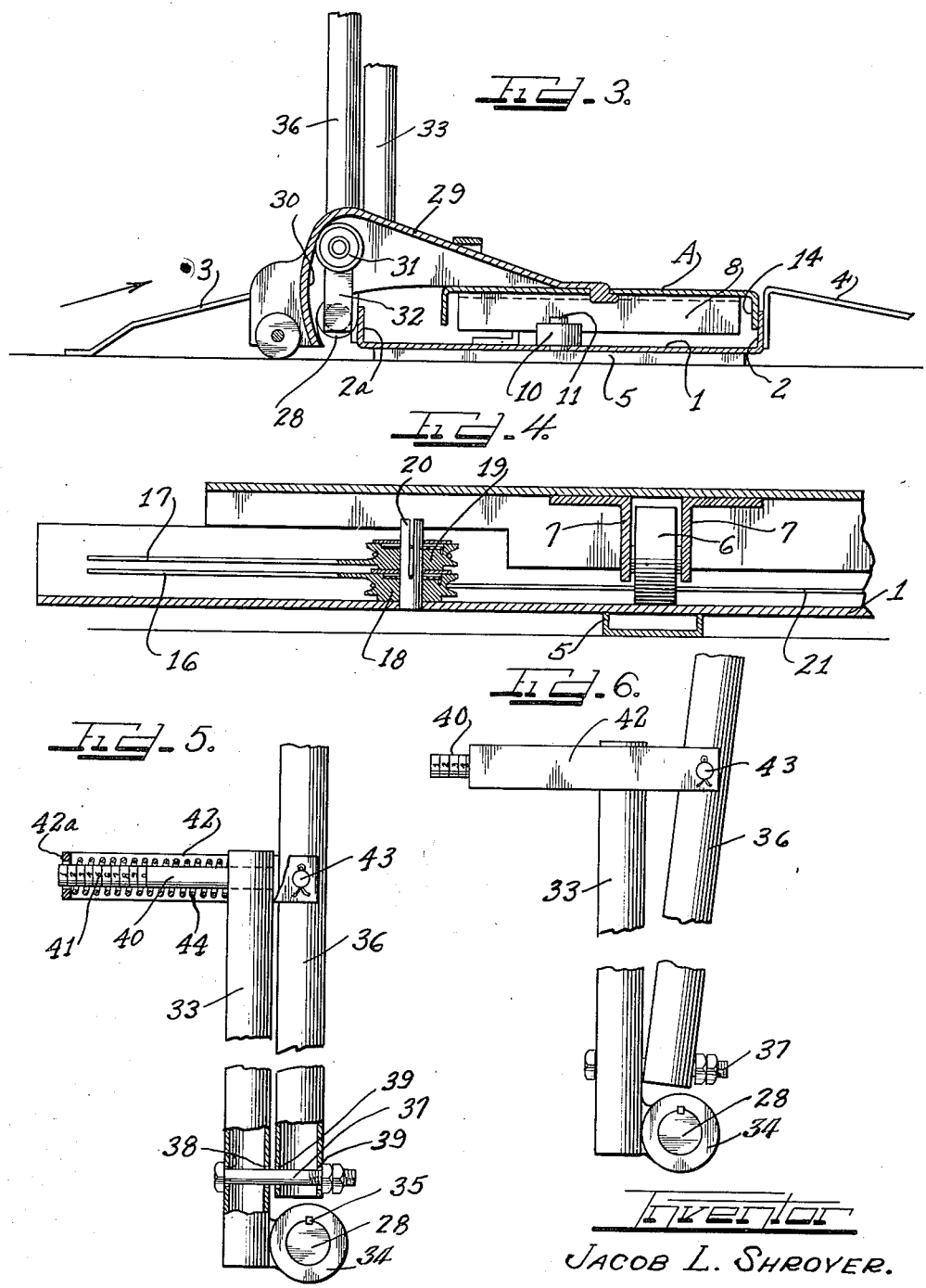

Patented Nov. 16, 1937

2,098,979

UNITED STATES PATENT OFFICE 2,098,979

AUTOMOBILE BRAKE TESTER

Jacob L. Shroyer, Oak Park, Ill.

Application April 17, 1936, Serial No. 74,893

7 Claims. (Cl. 265—1)

The present invention relates to an automobile brake tester, and more particularly to a mechanism or apparatus capable of indicating equal or maladjustment of the brakes of two wheels of a pair of automobile wheels, so that in the event of maladjustment proper adjustment may be made.

In connection with the use of four wheel brakes, it is sometimes the practice to adjust the brakes so that the braking effect applied to the front wheels is different from, preferably less than, the braking effect applied to the rear wheels.

The present invention has for an object the provision of a simple, readily portable apparatus or mechanism which may be put down anywhere for use for testing the brake adjustments of both wheels of a pair of automobile wheels, for example, both front wheels of an automobile, as well as both rear wheels.

Another object of the present invention is to provide a brake testing apparatus whereby any differential brake adjustment of the brakes of both wheels of the pair of wheels may be readily ascertained.

A further object of the present invention is to provide a brake testing apparatus wherein the resistive effect necessary to move a platform on which the braked wheels rest in such manner as to proportionately represent the braking effect of the wheels in service.

The above other and further objects of the present invention will be apparent from the following description and the accompanying drawings.

An embodiment of the present invention is illustrated in the accompanying drawings and the views thereof are as follows:

Figure 1 is a top plan view of a brake testing apparatus constructed in accordance with the present invention and showing in dotted lines certain of the details of the apparatus.

Figure 2 is a plan view of the base plate of the apparatus of the present invention, and a fragmental view, with parts in section, of a removable platform, and showing the preferred means for indicating movement of the platform under test conditions.

Figure 3 is a vertical sectional view taken substantially in the plane of line III—III of Fig. 1 and showing certain parts in elevation.

Figure 4 is an enlarged vertical sectional view taken on the plane indicated by line IV—IV of Fig. 1.

Figure 5 is a fragmental elevational view, with parts in section, of the manually operable means for moving the test platform, showing the parts in normal position, and Figure 6 is a fragmental elevational view of the manually operable means for moving the platform where resistance to movement is offered by the braked wheels, and illustrating the indicating means for showing the amount of resistive effects offered by the platform against movement by the moving means, as governed by the braked wheels on the test platform.

The drawings will now be explained.

The illustrated form of the invention includes a base plate 1 with upturned side walls 2 and 2a extending lengthwise of the base, and to which are welded or otherwise secured ramps 3 and 4 whereby an automobile may enter and leave the testing apparatus.

The flanges of the base plate 1 define a channel within which moves an elongated platform A which is a platform supporting the two wheels of a pair of automobile wheels undergoing tests. The length of the platform A is slightly less than the length of the base plate 1 while the width of the platform A is considerably less than the width of the base between its flanges so that the platform may have room for movement between the ramps.

Suitably secured to or integrally formed with the base plate 1, are runners 5 which directly rest on a floor or foundation underneath the apparatus, and underlying the automobile wheels when on the platform.

Carried by the under side of the platform A are sets of rollers 6 secured by means of suitable pins to bearing members 7, which in turn are suitably fastened to the under side of the platform. There is a set of such rollers near one end of the platform and a similar set near the other end of the platform, as may be readily observed in Fig. 1, and so disposed as to underlie the automobile wheels on the platform and overlie the runners 5.

Suitably secured to the under side of the platform A, at substantially mid-length thereof, are two transversely extending and lengthwise spaced angle bars 8 which between them form a guide 9 for a roller 10 supported on the plate 1 by a vertical pivot 11. The purpose of the roller 10 and the guide members 8 is to permit movement of the platform between the ramps without endwise displacement of the platform in service. Furthermore, the roller 10 serves as a pivot in event that the platform is oscillated by reason of unequal brake adjustment of the wheels being tested.

Secured to the base plate 1 are longitudinally extending angle members 12 which serve as abutments for springs 13 interposed between the abutments 12 and the flange 14 which extends downwardly from the platform A alongside the wall 2 of the base plate at the exit side of the apparatus. The springs 13 therefore tend to normally maintain the platform A with its flange 14 against the adjacent wall 2 of the base plate, which is the normal or inoperative position of the platform, as may be observed in Figs. 1, 2 and 3. The springs also function to reduce the sensitivity of the apparatus in practical operation. Without them, the equalization of the brakes could not be achieved.

At one end of the base plate 1 is etched or otherwise fashioned a scale 15 having suitable markings thereon to represent the extent of movement or displacement of the platform in service.

For swinging over the scale 15, two pointers 16 and 17 are provided. These pointers are connected to formed parts of hubs 18 and 19 respectively which are coaxially pivoted to a pin 20, suitably secured in the base plate 1. The pointers are preferably arranged, one above the other, as may be readily observed in Fig. 4.

For swinging the lower pointer 16, a cable 21 is secured at one end, as at 22, adjacent the end of the platform A remote from the scale 15. This cable passes around guide rollers 23 and 24 and is connected to the hub 18 of the pointer 16 so that any deflection of the remote end of the platform will be readily effective to swing the pointer 16.

The pointer 17 is oscillated about its pivot by means of a cable or cord 25 connected at one end, as at 26 to the adjacent end of the platform, and to the hub 19 of the upper pointer 17 with the result that any deflection of the platform will cause corresponding movement of the pointer 17.

In order to move the platform A, after a pair of automobile wheels have mounted it, the brakes are applied to the wheels, and the platform manually moved by the following instrumentalities:

Along the front flange 2a of the base plate 1, which is the lower flange as observed in Fig. 1 and the lefthand flange as observed in Fig. 3, are bearing lugs 27 for receiving an oscillatable shaft 28 which is parallel to the length of the platform. Suitably pivotally connected to the platform A, at substantially its mid-length, is a hooded member 29 into which projects one end of the shaft 28. The hood is fashioned with a curvilinear portion 30 against which a roller 31 moves under certain conditions.

Secured to the extremity of the shaft 28 within the hooded member 29 is an arm 32 carrying the roller 31 at an end, the other end being suitably connected to the shaft. The shaft 28 has its other end projecting slightly outwardly of the end of the plate 1, and outwardly of the adjacent ramp 3 as may be observed in Fig. 1, to afford space for entry of an automobile onto the testing apparatus, and adjacent the end of the base 1 carrying the scale 15.

Outwardly of the adjacent ramp 3, an upstanding member or lever member 33 is secured to the shaft by means of a collar 34 fastened to the shaft by a key 35, thus the lever 33 is connected to the shaft for oscillating it. A supplemental member or lever 36 extends along the lever 33 and projects above it with its upper end serving as a handle for oscillating the shaft 28. At its lower end, the supplemental lever 36 is connected to the lever 33 by means of a bolt 37 which passes through suitable apertures 38 in the lever 33 and enlarged apertures 39 in the supplemental lever 36 to allow play of the lever 36 on the bolt whereby the levers 36 and 33 may be angularly moved relatively to each other.

Attached to the upper extremity of the lever 33 is a bar or gauge member 40 carrying certain indicia 41 on it.

A yoke 42 is rotatively connected to the supplemental lever 36 by a pin 43 with the other extremity of the yoke forming a bridge 42a which is apertured to receive the gauge member 40. Surrounding the gauge member 40 between the lever 33 and the end of the yoke 42 is a spring 44 which is adapted to maintain the levers 33 and 36 in closely adjacent position, such as shown in Fig. 5, in which position the gauge cooperates with the bridge end 42a of the yoke 42 as an index member, to represent zero on the scale.

Figs. 1 to 5 inclusive show the apparatus in normal or inoperative position which is that occupied by all of the parts prior to a test.

The two wheels of a pair of automobile wheels are tested in the following manner: The automobile is driven onto the test apparatus in the direction of the arrows shown in Figs. 1 and 3, that is, from the bottom of the sheet of Fig. 1 and from the left of Fig. 3, up the ramp 3 onto the platform A whereupon the vehicle is stopped with the two wheels of a pair resting on the platform. The brakes are then applied to the wheels. The test operator then grasps the lever 36 and swings it to the right as viewed in Figs. 5 and 6 and to the left as viewed in Fig. 3, to move the platform A downwardly as viewed in Figs. 1 and 2, and to the left as viewed in Fig. 3, thus moving the platform or ground underneath the braked wheels, as distinguished from moving the braked wheels over the ground.

If the brakes on the wheels being tested are equally effective, the platform A will then move in a direction perpendicular to its length, such extent of movement being indicated by movement of the pointers 16 and 17 over the scale with both pointers in register, as with equal brake adjustment there is no tendency to oscillate the platform.

If, however, the brakes of the wheels being tested are unequally adjusted, then manipulation of the lever 36 will cause oscillation of the platform.

Suppose oscillation of the platform A would cause the righthand end thereof, as viewed in Figs. 1 and 2, to be moved to a greater extent than the lefthand end. In such event the pointer 16 would be moved a greater distance over the scale 15 than would the pointer 17, the difference of the positions of the pointers over the scale representing the maladjustment of the brakes. The test operator then would adjust the brakes, return the platform A to normal position, which would be accomplished by releasing the brakes of the wheels then return the lever 36 to normal position whereupon the springs 13 will automatically restore the platform to normal position. The brakes are again applied and the test repeated until the brakes are equalized, which would be shown by movement of the platform A perpendicular to its length without any oscillation.

Whenever the lever 36 is grasped to move the platform A, and there is any resistance to movement of the platform created by the braked wheels on it, the lever 36 will move away from the lever 33, as viewed in Fig. 6, thus moving the yoke 42 along the gauge 40 against the tension of the spring 44 to, say, the position shown in Fig. 6. In this position, the graduation 5 may be observed, which represents 500 pounds braking effort of the brakes as then set.

Whenever the platform A is moved perpendicular to its length, and there is any resistive effort to such movement by the braked wheels, the indication of such effect may be observed by the projection of the gauge 40, through the bridge end 42a of the yoke 42. If the operator of the testing apparatus knows the proper resistive effect for any car, he can then adjust the brakes to secure such effect, if the reading on the gauge 40 is not the proper one.

Carrying out a test on the present apparatus, the first thing done is to determine the relative adjustment of the two brakes which is shown by any oscillatory movement of the platform as the lever 36 is pulled. Should any such oscillatory movement occur during a test, the brakes of the pair of wheels are adjusted until repeated tests show no oscillatory movement of the platform. Having accomplished equal adjustment of the brakes, then there is to be determined the resistive effect of movement of the platform with respect to the braked wheels, to bring it up to the point to which the brakes of the particular machine are designed. This is accomplished by manipulation of the braking mechanism as a whole, by mechanics familiar with the same. When the desired resistive effect has been achieved, as may be observed on the gauge rod 40, then the other pair of wheels of the vehicle may be tested in like manner so that after test the driver of the vehicle may be assured that his brakes are evenly and properly adjusted to give the full braking effect of the car as designed by its manufacturer.

The connection between the levers 33 and 36, as heretofore described, is thought to be sufficient for any useful purpose. It is to be understood, however, that other connections might be made between these levers to accomplish the same purpose.

It will be observed that the test apparatus of the present invention is one which is so constructed as to be readily portable from place to place or permanently fixed in position by any suitable means, e. g., by bolts through holes 50 in the base plate 1. The apparatus very readily determines the degree of brake adjustment between both wheels of any pair of wheels of an automobile so that if maladjusted the brakes can be adjusted to provide the desired and designed braking effect, thus assuring maximum braking action of the vehicle so tested.

Arranging the scale 15 and the pointers 16 and 17 at the same end of the apparatus carrying the lever enables the test operator and the vehicle driver to very readily observe the condition of the brakes as soon as the operator moves the lever 36 in direction to move the platform underneath the braked wheels undergoing tests. The vehicle driver may observe the position of the pointers 16 and 17 without leaving the vehicle, simply by looking out of his window. Preferably the surface of the platform A is slightly below the high points of the ramps to thereby form a pocket for the wheels on the platform.

The indicia 1, 2, 3, 4, etc. on the gauge rod 40 may represent 100, 200, 300, 400 etc. pounds pressure, or resistance.

When the lever 36 is swung to rock the shaft 28, the roller 31 acts against the curved part 30 of the hood 29, with cam action. The curvature of the part 30 is such as to enable the springs 13 to restore the platform A and handle 36 to normal position, whenever the wheel brakes are released.

The invention has been described herein more or less precisely as to details, yet it is to be understood that the invention is not to be limited thereby, as changes may be made in the arrangement and proportion of parts and equivalents may be substituted, without departing from the spirit and scope of the invention.

The invention is claimed as follows:

1. A brake testing apparatus including a single movable platform adapted to receive both wheels of a pair of automobile wheels for testing the brakes thereof, means supporting said platform for bodily movement substantially perpendicular to its length and also for oscillatable movement about a central pivot, cooperating crank and cam means for moving said platform after said wheels are at rest thereon and the brakes thereof applied, means for actuating said crank means, and means for indicating the amount of perpendicular and oscillatory movement of said platform.

2. A brake testing apparatus including a single movable platform adapted to receive a pair of automobile wheels thereon for testing the brakes thereof, means supporting said platform for bodily movement substantially perpendicular to its length and also for oscillatable movement about a central pivot, cooperating crank and cam means for moving said platform after said wheels are at rest thereon and the brakes thereof applied, means for actuating said crank means, said last mentioned means being provided with means for visually representing the force necessarily applied to said moving means to move said platform under the conditions stated, and means for indicating the amount of perpendicular and oscillatory movement of said platform.

3. A brake testing apparatus including a single movable platform adapted to receive a pair of automobile wheels for testing the brakes thereof, means supporting said platform for bodily movement substantially perpendicular to its length and also for oscillatable movement about a central pivot, cooperating crank and cam means for moving said platform after said wheels are at rest thereon and the brakes thereof applied, means for actuating said crank means, said platform being movable perpendicularly to its length only when the brakes of said pair of wheels are equally effective and oscillatable when the brakes of said pair of wheels are unequally effective, and means for indicating the amount of perpendicular and oscillatory movement of said platform.

4. A brake testing apparatus including an elongated movable platform adapted to receive both wheels of a pair of wheels to be tested for relative adjustment, a base member supporting said platform, an oscillatable shaft pivoted to said base member and extending therealong parallel to the length of the platform, a member having a curvilinear portion pivoted to said platform at substantially its mid-length, a roller carried by said shaft and adapted to contact said curvilinear portion with cam action to move said platform in one direction when said shaft is rotated in one direction, means comprising relatively movable members to rotate said shaft in said one direction to move said platform with respect to the pair of wheels thereon, spring means for moving said platform in the opposite direction when said shaft is rotated in the opposite direction and to restore said shaft rotating means to normal position, and a single force measuring device operable by the relative movement of said shaft rotating means to register the resistance offered to movement of said platform by the pair of wheels on it.

5. A brake testing apparatus including an elongated movable platform adapted to receive both wheels of a pair of wheels to be tested for relative adjustment, a base member supporting said platform, said base supporting said platform for bodily movement of the platform perpendicular to its length and also for oscillatable movement about a central point, a shaft pivoted to said base member and extending therealong parallel to the length of said platform, a member having a curvilinear portion pivoted to said platform at substantially its midlength, a roller carried by said shaft and adapted to contact said curvilinear portion with cam action to move said platform in one direction when said shaft is rocked in one direction, means comprising relatively movable members to rock said shaft in said one direction to move said platform with respect to the pair of wheels thereon, spring means for moving said platform and said shaft rocking means in the opposite direction and for restoring said shaft rocking means to normal position, a single force measuring device operable by the relative movement by said shaft rocking means to register the resistance offered to movement of said platform by the pair of wheels on it, and means for indicating the relative shifting of the ends of said platform as said platform is moved by its moving means.

6. In a brake testing apparatus, a base member, an elongated platform to receive both wheels of a pair of wheels to be tested for relative adjustment, mounted on said base member to move in a direction perpendicular to its length and also to oscillate about a central point; a shaft oscillatable in said base member and supported in parallel relation to the length of said platform; an arm fixed to said shaft and supporting a roller at its free end; a member pivotally secured to said platform at substantially its mid-length and having a curved face against which said roller works with cam action; shaft rocking means including two relatively movable members, one of which is fixed to said shaft and the other of which is supported by said one member for swinging movement toward and away from said one member and constituting a handle for rocking said shaft, the upper extremity of said handle member adapted to be swung away from said one member when pressure is applied thereto to move the platform; force indicating means comprising parts carried by said two relatively movable members, one part comprising a bar having graduations on it and secured to said one member, another part comprising a yoke pivoted to said other member and having its bridge portion apertured to receive and slide along said bar as said members are relatively moved, the third part comprising a spring surrounding said bar and bearing at its ends against said one member and said yoke bridge and functioning to normally maintain said two members in closely adjacent relationship; the movement of said handle member to move said platform causing said yoke bridge to travel along said bar toward said one member to thereby permit observation to be made of the resistance offered by said platform to moving it by comparing the position of said yoke bridge with the graduations on said bar.

7. A brake testing apparatus including a single movable platform adapted to receive both wheels of a pair of automobile wheels for testing the brakes thereof, means supporting said platform for bodily movement substantially perpendicular to its length and also for oscillatory movement about a central pivot, means pivoted to said platform and constituting a cam, a crank engageable with said cam for moving said platform in one direction after said wheels are at rest thereon and the brakes of said wheels applied, spring means for moving said platform in the opposite direction, manually operable means including relatively movable members for actuating said crank, a force applying measuring device operable by the relative movement of said members directed to the resistance offered to movement of said platform by the pair of braked wheels on it, and means for indicating the amount of movement of said platform.

JACOB L. SHROYER.